(12) United States Patent
Weber (10) Patent No.: US 11,346,467 B2
(45) Date of Patent: May 31, 2022

(54) ADJUSTABLE ATTACHMENT APPARATUS

(71) Applicant: Owen James Weber, Neptune City, NJ (US)

(72) Inventor: Owen James Weber, Neptune City, NJ (US)

( * ) Notice: Subject to any disclaimer, the term of this patent is extended or adjusted under 35 U.S.C. 154(b) by 0 days.

(21) Appl. No.: 16/585,631

(22) Filed: Sep. 27, 2019

(65) Prior Publication Data

US 2020/0103053 A1    Apr. 2, 2020

Related U.S. Application Data

(60) Provisional application No. 62/739,367, filed on Oct. 1, 2018.

(51) Int. Cl.
*F16L 3/14* (2006.01)
*F16B 2/20* (2006.01)

(52) U.S. Cl.
CPC .    *F16L 3/14* (2013.01); *F16B 2/20* (2013.01)

(58) Field of Classification Search
CPC ..... F16L 3/14; F16L 3/22; F16L 3/221; F16L 3/237; F16B 2/20
See application file for complete search history.

(56) References Cited

U.S. PATENT DOCUMENTS

| | | | | |
|---|---|---|---|---|
| 1,274,312 A | * | 7/1918 | Nicoll | A45F 5/00 224/222 |
| 1,398,519 A | * | 11/1921 | Hosch | A47G 25/12 248/316.7 |
| 1,495,925 A | * | 5/1924 | Quertermous | A41F 9/007 24/182 |
| D175,455 S | * | 8/1955 | Bartleman | A61M 5/008 D6/572 |
| 3,003,736 A | * | 10/1961 | Hofgesang | A47G 29/08 248/229.26 |
| 3,273,766 A | * | 9/1966 | Cosentino | A44C 5/0046 224/197 |
| 3,550,824 A | * | 12/1970 | Bohanski | F21V 21/08 224/197 |
| 3,850,393 A | * | 11/1974 | Marquard | A61J 9/0684 248/102 |
| 4,220,302 A | * | 9/1980 | Hampton | A61J 9/0676 224/148.6 |
| 5,289,961 A | * | 3/1994 | Levitt | A45F 5/00 224/219 |
| 5,572,747 A | * | 11/1996 | Cheng | A44B 11/12 2/312 |
| D379,060 S | * | 5/1997 | Laga | A61J 9/0684 D8/373 |

(Continued)

*Primary Examiner* — Anita M King
(74) *Attorney, Agent, or Firm* — John Maldjian; Stevens & Lee PC (57) ABSTRACT

An element retention and placement strip comprises a flexible band designed to fit around one or more objects, a fastener associated with the flexible band employing a female fastener area and a male fastener area for connecting the flexible band to an object. The male fastener area comprises a plurality of tensioners disposed on the surface of the male fastener area for securely locking the flexible band to an object. At least one or more clasps attached to the flexible band, such that the clasps may be fixed, rotatable or movable along the axis of the flexible band. The clasps may be of plurality of sizes and use plurality of locking mechanisms for holding the element.

17 Claims, 7 Drawing Sheets

(56) References Cited

U.S. PATENT DOCUMENTS

| | | | | |
|---|---|---|---|---|
| 5,749,504 A * | 5/1998 | Bieker | ............... | A45F 3/00 |
| | | | | 224/221 |
| 5,970,526 A * | 10/1999 | Weathers | ............... | A41F 9/002 |
| | | | | 2/311 |
| 6,067,662 A * | 5/2000 | Sim | ............... | A44B 11/14 |
| | | | | 2/322 |
| 6,138,976 A * | 10/2000 | Fahringer, Sr. | ............... | A01K 97/10 |
| | | | | 211/70.8 |
| 7,159,281 B1 * | 1/2007 | Irizarry | ............... | A45F 5/021 |
| | | | | 224/247 |
| 2001/0030271 A1 * | 10/2001 | Weesner | ............... | A61M 5/008 |
| | | | | 248/316.7 |
| 2006/0192059 A1 * | 8/2006 | Morello | ............... | F16L 3/16 |
| | | | | 248/74.3 |

* cited by examiner

View A

FIG. 6

View A

FIG. 7

ADJUSTABLE ATTACHMENT APPARATUS

CROSS-REFERENCE TO RELATED APPLICATIONS

This application claims the benefit of U.S. Provisional Application Ser. No. 62/739,367 filed Oct. 1, 2018, entitled "Novel Retention and placement of Wires and the Like", which is incorporated herein by reference in its entirety.

FIELD OF INVENTION

Embodiments of the present invention generally relate to an apparatus useful in the placement and retention of elements, and in particular relates to multiple fixed or movable clasps attached to a band for the attachment of temporary and/or permanent elements around an object of any shape or size.

BACKGROUND

Traditional plastic strips are often used to secure elements, such as, but not limited to, wires, lights, cables, etc. in various locations. In some instances due to the size of an element, a multiplicity of strips are required to secure said element in place. In addition, a traditional securing strip is limited in that it is only capable of securing one element. Thus, separate strips are often necessary to secure multiple elements particularly where each element varies in size.

Conventionally, there are no means of utilizing a traditional plastic strip to secure multiple elements having multiple sizes and shapes. The conventional techniques or devices typically do not have the flexibility and do not cover the desired scenarios that may assist in attaching the element(s) to any railing, banister, or column. In addition, attaching an element to light poles, banisters, columns and similar objects can especially challenging.

To ensure safety needs and to prevent the element or elements to be secured from falling, there is a need to replace the conventional plastic strip by an apparatus or assembly capable of securing and retaining multiple elements and, in particular, multiple elements of different shapes and sizes.

Accordingly, it is desirable to provide an apparatus or an assembly for element retention and placement in order to ensure simple and easy installation of elements around objects of distinct shapes and sizes in secured fashion.

SUMMARY

The present invention generally relates to an adjustable attachment apparatus for securing an element to one or more objects of varying size. For example, in one embodiment of the present invention, the adjustable attachment apparatus comprises a band, comprising a fastener adapted to interlock both ends of the band. In a preferred embodiment of the present invention, the band is made of a flexible material. However, in another embodiment of the present invention, the band may made of a rigid material. The adjustable attachment apparatus further comprises one or more clasps arranged linearly on surface of the band. In one embodiment of the present invention, the clasps are configured to rotate and acquire any direction and therefore may orient in parallel as well as perpendicular direction. In another embodiment of the present invention, the clasp may be removed and reused or moved longitudinally over the surface of the flexible band to configure its position as required.

In an embodiment of the present invention, the adjustable attachment apparatus is for both indoor/outdoor use.

Briefly described, in an example embodiment, the present adjustable attachment apparatus overcomes the above-mentioned disadvantages and meets the recognized need for an adjustable attachment apparatus comprising a plurality of clasps and a fastener. The method of use thereof comprising, in general, an adjustable attachment apparatus comprising a band having a first band end comprising a male fastening area and a second band end comprising a female fastening area. The adjustable attachment apparatus may form a loop while securing an object using an interlocking mechanism. The interlocking mechanism locks the male fastening area with the female fastening area. Moreover, increased insertion of the male fastening area in the female fastening area decreases the size of the loop formed by the adjustable attachment apparatus while securing the adjustable attachment apparatus to the surface of the object. In other embodiments of the present invention, the interlocking mechanism may comprise include a zip tie, Velcro®, snap or like mechanism.

For affixing the adjustable attachment apparatus to larger objects, several adjustable attachment apparatuses may be combined to accommodate the size of the larger object.

In another embodiment of the present invention, a fastener such as a screw or nail may be utilized to fix the position of the adjustable attachment apparatus to the surface of the object.

An embodiment of the present invention provides an adjustable attachment apparatus for element retention and placement. The adjustable attachment apparatus comprises a flexible band and a fastener. The adjustable attachment apparatus may be designed to fit around one or more objects. The fastener associated with the adjustable attachment apparatus comprises a female fastener area and a male fastener area. The female fastener area and the male fastener area uses an interlocking mechanism for connecting the adjustable attachment apparatus and tightening the adjustable attachment apparatus to one or more objects. In one embodiment of the present invention, the interlocking mechanism includes a male fastener area comprising a plurality of tensioners for securely locking the adjustable attachment apparatus to the one or more objects. In other embodiments of the present invention, the interlocking mechanism may comprise a zip tie, Velcro®, snap or like mechanism. Further, the adjustable attachment apparatus comprises at least one clasp that may be fixedly attached, or movable along the axis of the flexible band. The clasp may have plurality of sizes and uses plurality of locking mechanisms for holding the element. In an embodiment of the present invention, the locking mechanism comprises a friction fit where fastening of the element to the clasp is achieved by friction after the element and clasp are pushed together. In other embodiments of the present invention, the locking mechanism may include a zip tie, Velcro®, snap or like mechanism.

In another embodiment of the present invention, the adjustable attachment apparatus is comprised of a rigid band having at least one clasp that may be fixedly attached, or movable along the axis of the band. The clasp may have plurality of sizes and uses plurality of locking mechanisms for holding the element. In an embodiment of the present invention, the locking mechanism is a friction fit, whereby an element is secured to the clasp by way of friction created when the element and clasp are pressed together. Conversely, the element may be removed from the clasp by a simple pulling motion. In other embodiments of the present invention, the locking mechanism may include a zip tie, Velcro®, snap or like mechanism.

Another embodiment in accordance with the present invention provides an adjustable attachment apparatus for element retention and placement. The adjustable attachment apparatus comprises a flexible band and a fastener. The adjustable attachment apparatus may be designed to fit around one or more objects. The fastener associated with the adjustable attachment apparatus comprises a female fastener area and a male fastener area. The female fastener area and male fastener area may comprise an interlocking mechanism for connecting the adjustable attachment apparatus and tightening the adjustable attachment apparatus to one or more objects. The male fastener area comprises a plurality of tensioners for securely locking the adjustable attachment apparatus to the one or more objects. In other embodiments of the present invention, the interlocking mechanism may comprise a zip tie, Velcro®, snap or like mechanism. Further, one or more clasp may be fixedly attached to the flexible band or movable along the axis of the flexible band. Further, the clasp may be rotatable along an axis of the flexible band. The clasp may have plurality of sizes and uses plurality of mechanisms for holding the element.

In other embodiments of the present invention, the adjustable attachment apparatus comprises a rigid band and a fastener. The fastener associated with the adjustable attachment apparatus comprises a zip tie, Velcro®, snap or like mechanism to secure the adjustable attachment apparatus to an object. Further, the adjustable attachment apparatus comprises at least one clasp that may be fixedly attached, or movable along the axis of the rigid band. The clasp may have plurality of sizes and uses plurality of locking mechanisms for holding the element. In an embodiment of the present invention, the locking mechanism comprises a friction fit where fastening of the element to the clasp is achieved by friction after the element and clasp are pushed together. In other embodiments of the present invention, the locking mechanism may include a zip tie, Velcro® snap or like mechanism. In other embodiments of the present invention, the adjustable attachment apparatus may be secured to one or more objects by screw, nail, bolt, rivet or like mechanism.

Yet another embodiment in accordance with the present invention provides an adjustable attachment apparatus for element retention and placement comprising a flexible band to fit around one or more objects using a female fastener area and a male fastener area. A plurality of interlocking mechanisms may be used for holding the female fastener area and the male fastener area in a secured position. Further, the adjustable attachment apparatus comprises one or more rotatable clasp for holding one or more element. The rotatable clasp may be fixedly attached to the flexible band or movable along the axis of the flexible band.

In another embodiment of the present invention, the flexible band may be replaced with a rigid band.

The preceding is a simplified summary to provide an understanding of some embodiments of the present disclosure. This summary is neither an extensive nor an exhaustive overview of the present disclosure and its various embodiments. The summary presents selected concepts of the embodiments of the present disclosure in a simplified form as an introduction to the more detailed description presented below. As will be appreciated, other embodiments of the present disclosure are possible utilizing, alone or in combination, one or more of the features set forth above or described in detail below.

BRIEF DESCRIPTION OF THE DRAWINGS

The foregoing and other aspects of the embodiments disclosed herein are best understood from the following detailed description when read in connection with the accompanying drawings. For the purpose of illustrating the embodiments disclosed herein, there is shown in the drawings embodiments that are presently preferred, it being understood, however, that the embodiments disclosed herein are not limited to the specific instrumentalities disclosed. Included in the drawings are the following figures.

While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the particular form disclosed, but to the contrary, the present disclosure is to cover all modifications, equivalents and alternatives falling within the spirit and scope of embodiments of the present disclosure.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

It will be noted that throughout the appended drawings, like features are identified by like reference numerals.

DETAILED DESCRIPTION

In the following detailed description, numerous specific details are set forth in order to provide a thorough understanding of embodiments or other examples described herein. In some instances, well-known methods, procedures and/or components have not been described in detail, so as to not obscure the following description.

Further, the examples disclosed are for exemplary purposes only and other examples may be employed in lieu of, or in combination with, the examples disclosed. It should also be noted the examples presented herein should not be construed as limiting of the scope of embodiments of the present disclosure, as other equally effective examples are possible and likely.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Figure 1:
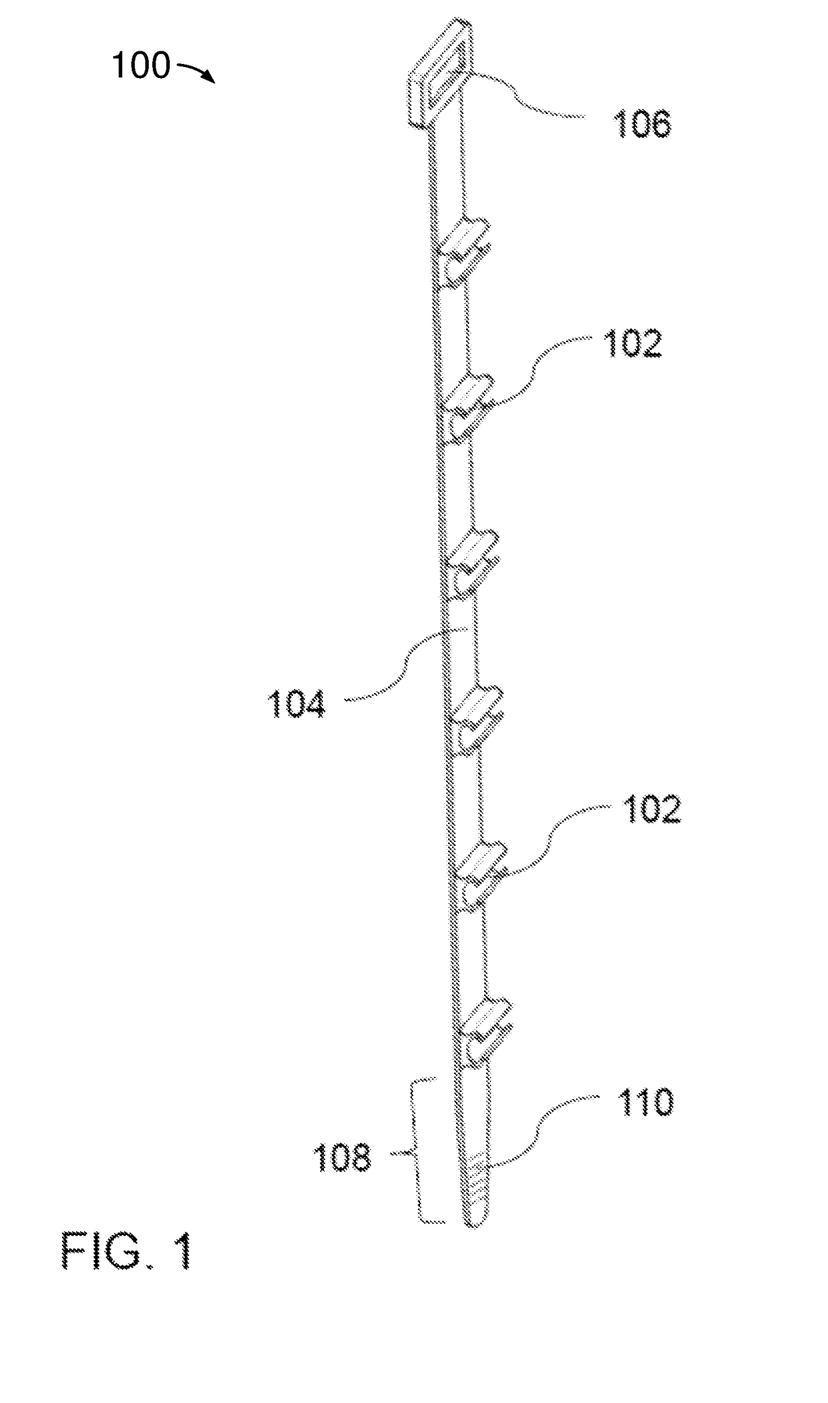
FIG. 1 illustrates a side perspective view of the adjustable attachment apparatus with perpendicular clasps, according to an embodiment of the present invention.

FIG. 1 depicts a side perspective view of an adjustable attachment apparatus 100 with multiple clasps 102 arranged in a perpendicular manner with respect to the flexible band 104, according to an embodiment of the present invention. In an embodiment of the present invention, the clasps 102 are for retention and placement of an element. The adjustable attachment apparatus 100 may be of varying lengths and designed to fit around objects of different shapes and sizes. The adjustable attachment apparatus 100 comprises an flexible band 104 having one or more clasps 102 to receive an element, such as, but not limited to a wire, a light string, a cord, a ribbon, a cable, and so forth. The adjustable attachment apparatus 100 is made of a flexible material that may be natural or synthetic such as rubber, plastic, metal or any other flexible material and may be of variable length and variable thickness. In other embodiments of the present invention, the adjustable attachment apparatus 100 may comprise a rigid material. The adjustable attachment apparatus 100 holds and secures an element to an object without the need for any additional securing devices. A fastener may be associated with the adjustable attachment apparatus 100 to secure the adjustable attachment apparatus to an object. In an embodiment of the present invention, the fastener includes an interlocking mechanism comprising a female fastener area 106 and a male fastener area 108 for connecting and tightening the adjustable attachment apparatus 100 to an object. The female fastener area 106 of the flexible band 104 is designed with a hollow portion where the male fastener area 108 exits to form a loop and the female fastener area 106 gets engaged to the male fastener area 108. In another embodiment of the present invention, the interlocking mechanism may comprise a zip tie, Velcro®, snap or like mechanism.

Further, referring to FIG. 1, one or more tensioners 110 are set up on the surface of the male fastener area 108 to hold and lock the adjustable attachment apparatus 100. The tensioners 110 may include pegs or bumps that are configured to interlock the female fastener area 106 and male fastener area 108. The tensioners 110 secure the adjustable attachment apparatus 100 to an object including but not limited to, a light post. Furthermore, the clasp 102 comprises two legs facing each other, each leg having a curved shape. In an embodiment of the present invention, the legs of the clasp 102 create a locking mechanism where fastening of an element to the clasp is achieved by friction when the element and clasp are pushed together. According to an embodiment of the present invention one or more clasps 102, may be set up along the length of the flexible band 104. Referring to FIG. 1, such setup enables the clasp(s) 102 to hold and secure an element in a perpendicular orientation with respect to the flexible band 104 of the adjustable attachment apparatus 100. In another embodiment of the present invention, the locking mechanism of the clasps 102 comprises a flexible material that expands open to allow for the insertion of an element and would then retract around the element to hold the element in place. In other embodiments of the present invention, the locking mechanism of the clasp 102 may comprise a zip tie, Velcro®, snap or like mechanism.

In another embodiment of the present invention, the clasps 102 are removable from the flexible band 104 and reusable. In another embodiment of the present invention, the adjustable attachment apparatus 100 may be used both indoors and outdoors.

Clasps 102 may be permanently attached to the flexible band 104 or removable and placed in various configurations on the flexible band 104 to accommodate an element or elements.

Figure 2:
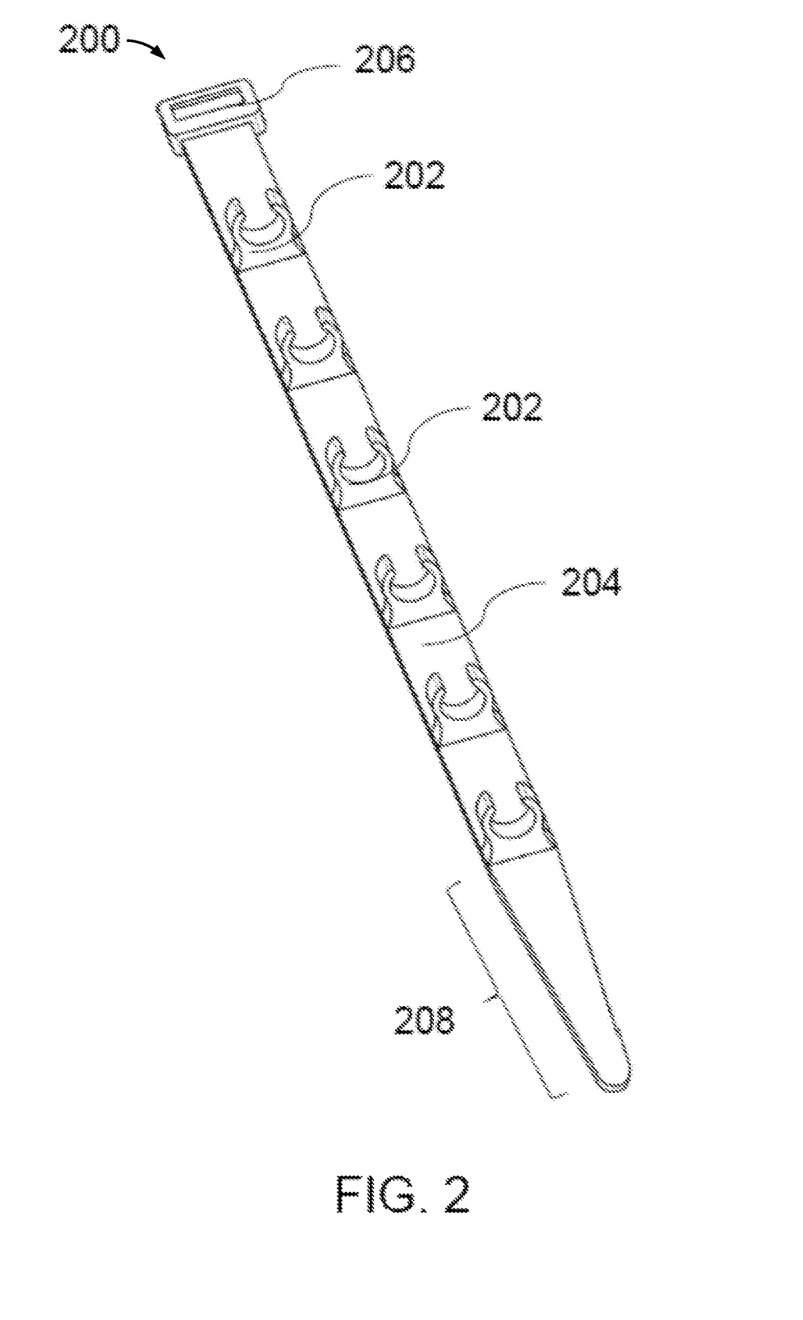
FIG. 2 illustrates a top perspective view of the adjustable attachment apparatus with parallel clasps, according to an embodiment of the present invention.

FIG. 2 depicts a top perspective view of an adjustable attachment apparatus 200 with parallel clasps 202, according to an embodiment of the present invention. Such setup enables the clasps 202 to hold and secure an element in a parallel orientation with respect to the flexible band 204 of the adjustable attachment apparatus 200. The adjustable attachment apparatus 200 may be designed to fit around objects of different shapes and sizes. The adjustable attachment apparatus 200 comprises a flexible band 204, one or more clasps 202 to receive an element, such as, but not limited to, a wire, a light string, a cord, a ribbon, a cable, and so forth. The adjustable attachment apparatus 200 is made of a flexible material that may be natural or synthetic such as rubber, plastic, metal or any other material. In another embodiment of the present invention, the adjustable attachment apparatus 200 comprises a rigid material. The adjustable attachment apparatus 200 may be of variable length and variable thickness. The clasps 202 of the adjustable attachment apparatus 200 receive and hold an element, including but not limited to a wire, a light string, a cord, a ribbon, a cable, and so forth, wherein the adjustable attachment apparatus 200 may then be attached to an object such as a light post without the use of any additional securing devices. A fastener may be associated with the adjustable attachment apparatus 200 that uses a female fastener area 206 and a male fastener area 208 for connecting and tightening the adjustable attachment apparatus 200 to an object. The female fastener area 206 of the adjustable attachment apparatus 200 is designed with a hollow portion where the male fastener area 208 exits to form a loop and the female fastener area 206 gets engaged to the male fastener area 208. In other embodiments of the present invention, the adjustable attachment apparatus is fastened to an object by a zip tie, Velcro®, snap or like mechanism.

Further, referring to FIG. 2, the clasp 202 may comprise two legs facing each other with a curved shape. In an embodiment of the present invention, the legs of the clasp 202 create a locking mechanism where fastening of an element to the clasp 202 is achieved by friction when the element and clasp 202 are pushed together. According to an embodiment of the present invention, one or more clasps 202 may be set up along the length of the flexible band 204. Such setup enables the clasp 202 to hold the element in a parallel orientation with respect to the flexible band 204 of the adjustable attachment apparatus 200. Clasps 202 may be permanently attached the flexible band 204 or removable and placed in various configurations on the flexible band 204 to accommodate an element or elements. In other embodiments of the present invention, the locking mechanism of the clasps 202 may include a zip tie, Velcro®, snap or like mechanism.

In another embodiment of the present invention, the clasps 202 are removable from the flexible band 204 and reusable. In another embodiment of the present invention, the adjustable attachment apparatus 200 may be used for both indoor and outdoor use.

Figure 3A:
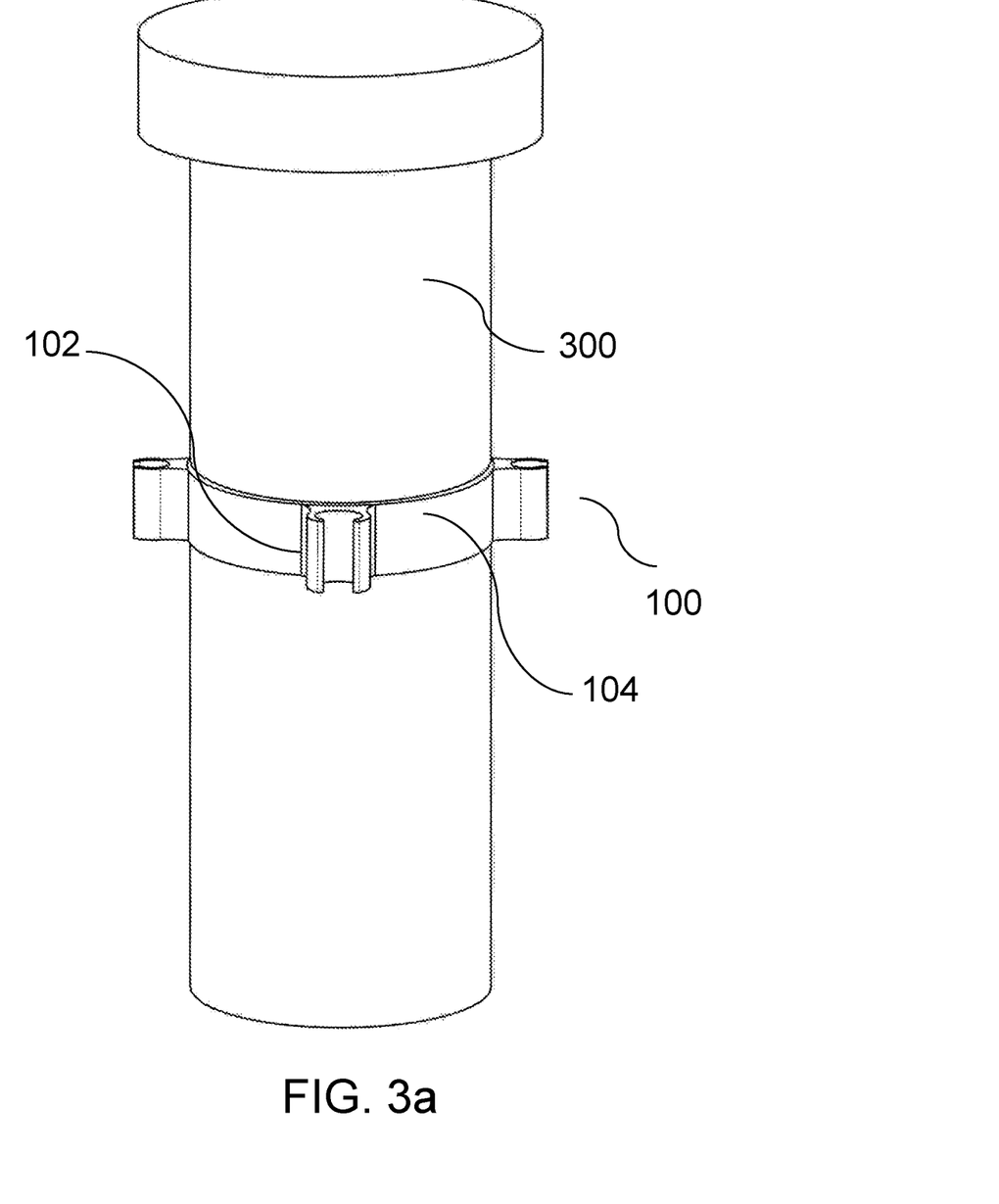
FIG. 3a illustrates a perspective view of the adjustable attachment apparatus secured around a cylindrical object, according to an embodiment of the present invention.

FIG. 3a depicts a front perspective view of an adjustable attachment apparatus 100, as shown in FIG.1, secured around a column 300, according to an embodiment of the present invention. The adjustable attachment apparatus 100 comprises one or more clasps 102 setup in a perpendicular manner along the length of an flexible band 104, the clasp 102 may attach an element, such as, but not limited to, a wire, a light string, a cord, a ribbon, a cable, and so forth. In another embodiment of the present invention, the clasps 102 may be arranged in a parallel manner. The adjustable attachment apparatus 100 is made of a flexible, material that maybe natural or synthetic such as rubber, plastic, metal or any other material. In another embodiment of the present invention, the attachment apparatus 100 is made of a rigid material. The adjustable attachment apparatus 100 may be of a variable length and a variable thickness. The clasps 102 of the adjustable attachment apparatus 100 receive and hold an element with the adjustable attachment apparatus 100 being attached to the column 300 without the use of any additional securing devices. The adjustable attachment apparatus 100 may be affixed to an object prior to the elements being secured to the clasps 102. In an alternative embodiment of the present invention, the elements are first secured to the clasps 102 and the adjustable attachment apparatus 100 is then affixed to an object. In an embodiment of the present invention, the adjustable attachment apparatus 100 uses an interlocking mechanism for connecting and securing the adjustable attachment apparatus 100 to the column 300. The clasp 102 may be set up to hold the element in a perpendicular or parallel orientation with respect to the flexible band 104 of the adjustable attachment apparatus 100.

Figure 3B:
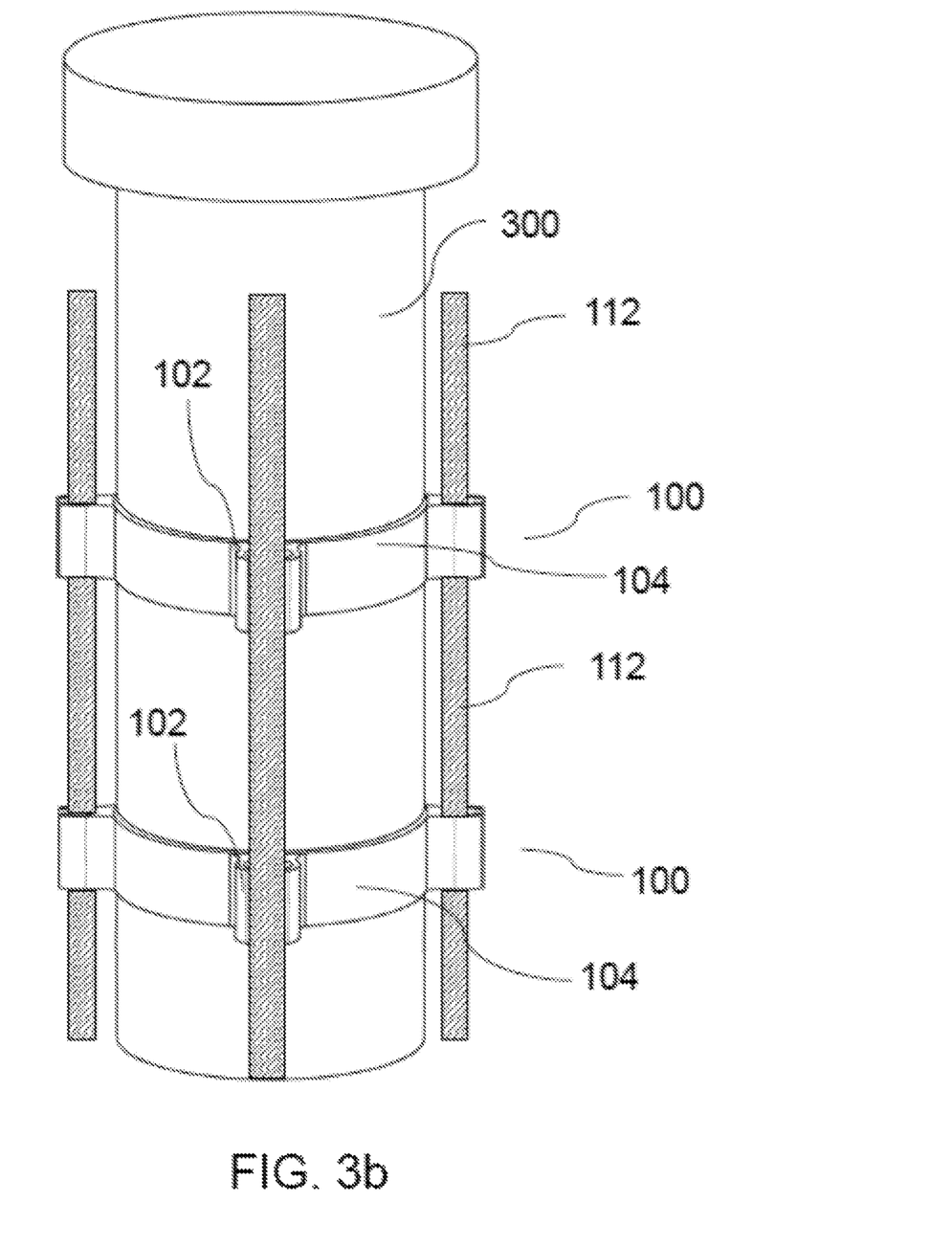
FIG. 3b illustrates a perspective view of a plurality of adjustable attachment apparatuses securing multiple cables in use according to an embodiment of the present invention.

FIG. 3b depicts a front perspective view illustrating multiple adjustable attachment apparatuses 100 secured around a column 300, according to an embodiment of the present invention. Each adjustable attachment apparatus 100 comprises one or more clasps 102 setup in a perpendicular manner along the length of a flexible band 104. The multiple adjustable attachment apparatuses 100 are shown securing several cables 112 through use of the clasps 102. The clasps 102 are oriented to secure the cables 112 in a perpendicular orientation with respect to the flexible band 104 of the adjustable attachment apparatus 100. The clasps 102 may attach an element, such as, but not limited to, a wire, a light string, a cord, a ribbon, a cable, and so forth.

Figure 4:
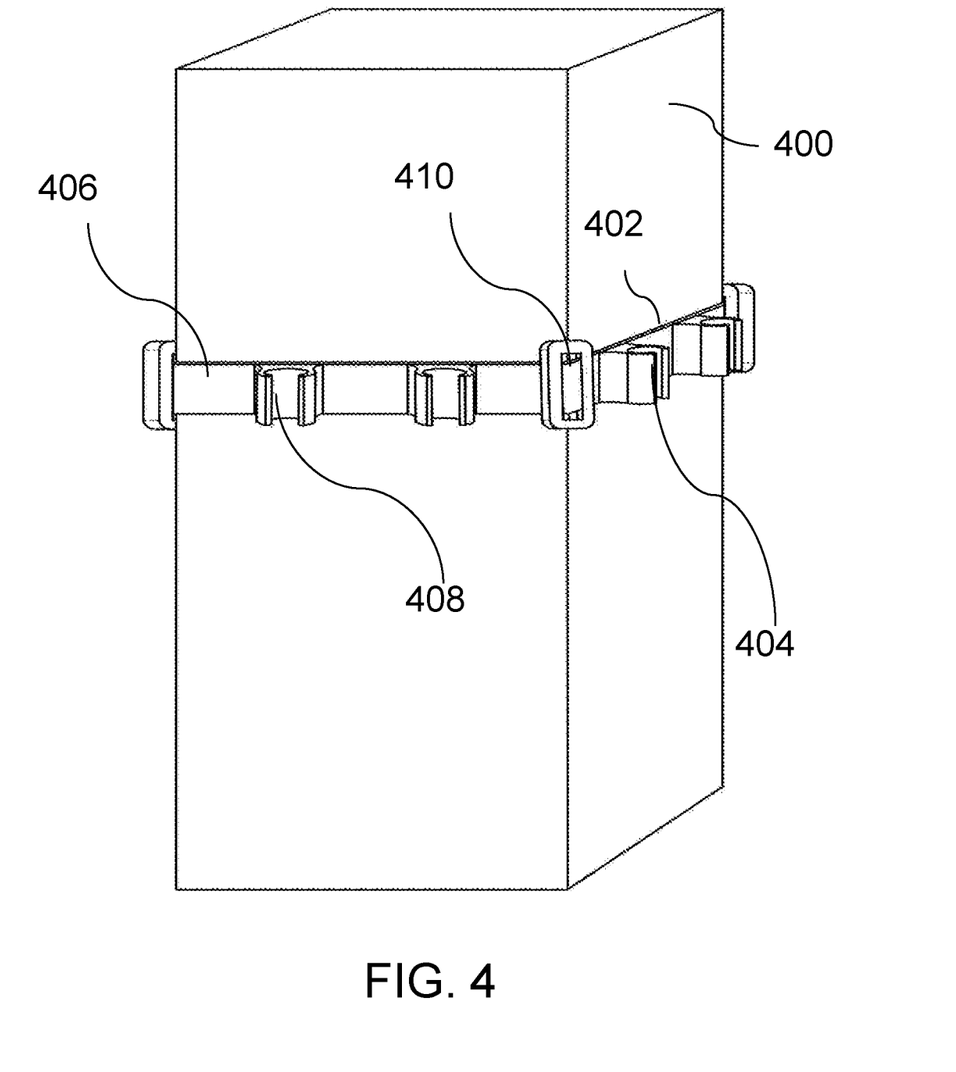
FIG. 4 illustrates a perspective view of the plurality of adjustable attachment apparatuses secured around a rectangular post, according to an embodiment of the present invention.

FIG. 4 depicts a perspective view of a plurality of adjustable attachment apparatuses 402 secured around a rectangular post 400, according to an embodiment of the present invention. The adjustable attachment apparatus 402 comprises one or more clasps 404 for attaching temporary elements like light strings, cords, ribbons, wires or cables around the rectangular post 400. In an embodiment of the present invention multiple adjustable attachment apparatuses may be attached together to accommodate objects having a larger diameter and exterior surface area. In FIG. 4, the adjustable attachment apparatus 402 and the adjustable attachment apparatus 406 may be interlocked through a locking mechanism 410 to encompass rectangular post 400 or larger diameter objects. The locking mechanism 410 may utilize the male fastener area of the adjustable attachment apparatus 402 and the female fastener area of the adjustable attachment apparatus 406. In an embodiment of the present invention, the adjustable attachment apparatus 402 and the adjustable attachment apparatus 406 may have clasps 404 and clasps 408, respectively, in a parallel or perpendicular orientation, such that the clasps 404 and clasps 408 can be either parallel or perpendicular to the length of the object to which it is attached, namely railings, bannisters, rectangular post 400, or larger diameter tubes, columns and other objects.

Figure 5A:
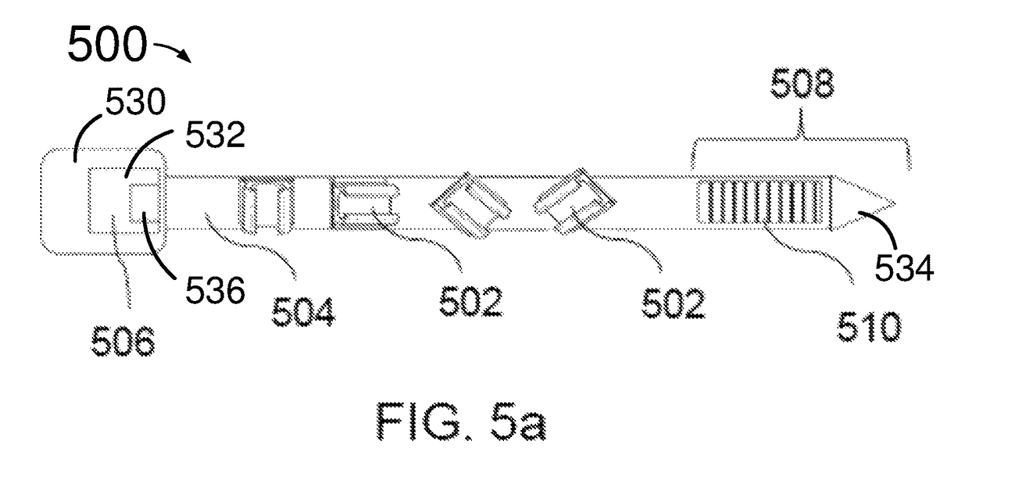
FIG. 5a illustrates a top perspective view of the adjustable attachment apparatus with rotatable clasps, according to an embodiment of the present invention.

FIG. 5a depicts a perspective view of an adjustable attachment apparatus 500 with rotatable clasp 502 for retention and placement of element, according to an embodiment of the present invention. The adjustable attachment apparatus 500 may be designed to fit around objects of different shapes and sizes. The adjustable attachment apparatus 500 comprises a flexible band 504, one or more rotatable clasps 502 to attach an element, such as, but not limited to, a wire, a light string, a cord, a ribbon, a cable, and so forth. In an embodiment of the present invention, the adjustable attachment apparatus 500 is made of a flexible material that maybe natural or synthetic such as rubber, plastic, metal or any other material. In another embodiment of the present invention, the adjustable attachment apparatus 500 comprises a rigid material. The adjustable attachment apparatus 500 may be of variable length and variable thickness. In an embodiment of the present invention, the adjustable attachment apparatus 500 comprises a flexible material to allow the adjustable attachment apparatus 500 to be attached to objects of varying texture sizes and shapes. The adjustable attachment apparatus 500 holds and secures an element to one or more objects without the use of any additional securing devices. A fastener may be associated with the adjustable attachment apparatus 500 that uses a female fastener area 506 and a male fastener area 508 for securing the adjustable attachment apparatus 500 and to an object. The female fastener area 506 of the flexible band 504 is designed with a hollow portion where the male fastener area 508 exits to form a loop and the female fastener area 506 gets engaged to the male fastener area 508.

Further, referring to FIG. 5a, one or more tensioners 510 are set up on the surface of the male fastener area 508 to hold and lock the flexible band 504 to an object. The tensioners 510 may include pegs or bumps that are configured to interlock the female fastener area 506 and male fastener area 508. The tensioners 510 secure the flexible band 504 to an object and act as a safety mechanism to prevent the adjustable attachment apparatus 500 from detaching from the object. Furthermore, the rotatable clasp 502 is analogous to clasps 102 and 202 of FIG.1 and FIG. 2, respectively, comprising two legs facing each other with a curved shape. The legs and curved shape of the clasp 502 create a locking mechanism comprising a friction fit where fastening of the element to the clasp 502 is achieved by friction after the element and clasp are pushed together. The rotatable clasp 502 may be spaced and oriented at various angles along the axis of the flexible band 504 to hold the element in any possible orientation. In another embodiment of the present invention, the clasp 502 may move longitudinally along the axis of the flexible band 504. In other embodiments of the present invention, the locking mechanism may include a zip tie, Velcro®, snap or like mechanism.

In an embodiment of the present invention, the clasps 502 may be permanently attached the flexible band 504 or removable and placed in various configurations on the flexible band 504 to accommodate an element or elements. In another embodiment of the present invention, the clasps 502 are removable from the flexible band 504 and reusable. In another embodiment of the present invention, the adjustable attachment apparatus 500 may be used both indoors and outdoors.

In the example of FIG. 5a, a first end 530 of band 504 has opening 532 (i.e., the hollow area) through which to receive a second end 534 of band 504. First end 530 of band 504 includes a tab 536 that ex-tends into opening 532 to lockingly engage a protrusion (i.e., of tensioners 510) that extends from a surface of band 504 when second end 534 of band 504 is inserted through opening 532, to secure band 504 to the object.

Figure 5B:
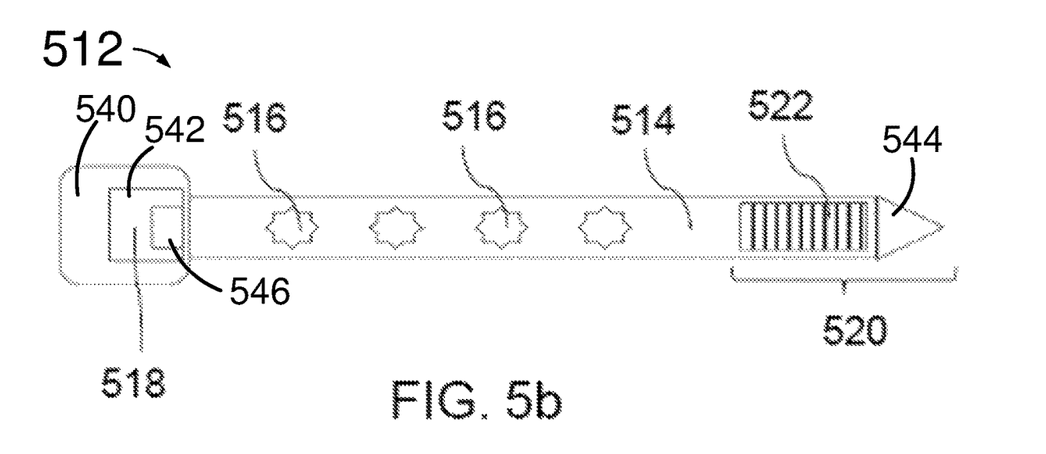
FIG. 5b illustrates a top perspective view of the adjustable attachment apparatus without clasps, according to an embodiment of the present invention.

FIG. 5b depicts a perspective view of an adjustable attachment apparatus 512 without a clasp, according to an embodiment of the present invention. The adjustable attachment apparatus 512 may be designed to fit around objects of different shapes and sizes. The adjustable attachment apparatus 512 comprises a flexible band 514, a plurality of holes 516 for attaching a clasp or clasps (not shown) as per the required position or orientation. The adjustable attachment apparatus 512 is made of a flexible material that may be natural or synthetic such as rubber, plastic, metal or any other material. In an embodiment of the present invention, the securing clip 512 comprises a flexible material to allow the adjustable attachment apparatus 512 to be attached to objects of varying texture sizes and shapes. The adjustable attachment apparatus 512 may be of variable length and variable thickness. The adjustable attachment apparatus 512 holds and secures an element to one or more objects without the use of any additional securing devices. A fastener may be associated with the adjustable attachment apparatus 512 that uses a female fastener area 518 and a male fastener area 520 for connecting the adjustable attachment apparatus 512 and tightening the adjustable attachment apparatus 512 to an object. The female fastener area 518 of the flexible band 514 is designed with a hollow portion where the male fastener area 520 exits to form a loop and the female fastener area 518 gets engaged with the male fastener area 520.

Further, referring to FIG. 5b, one or more tensioners 522 are set up on the surface of the male fastener area 520 to hold and lock the flexible band 514. The tensioners 522 may include pegs or bumps configured to interlock the female fastener area 518 and the male fastener area 520. The tensioners 522 secure the objects to the flexible band 514 and acts as a safety gear that provides the anti-dropping security. Furthermore, the holes 516 may of any shape, any size or configuration known to a person skilled in the art.

Referring to FIG. 5b, clasps (not shown) may be securely attached to the flexible band 514 by inserting the clasps into the holes 516 in the desired configuration. In one embodiment of the present invention, the clasps are snapped into the holes 516 and secured to the flexible band 514. In another embodiment of the present invention, the clasps (not shown) are removable from the flexible band 514 and reusable. In another embodiment of the present invention, the adjustable attachment apparatus 512 may be used both indoors and outdoors.

Figure 6:
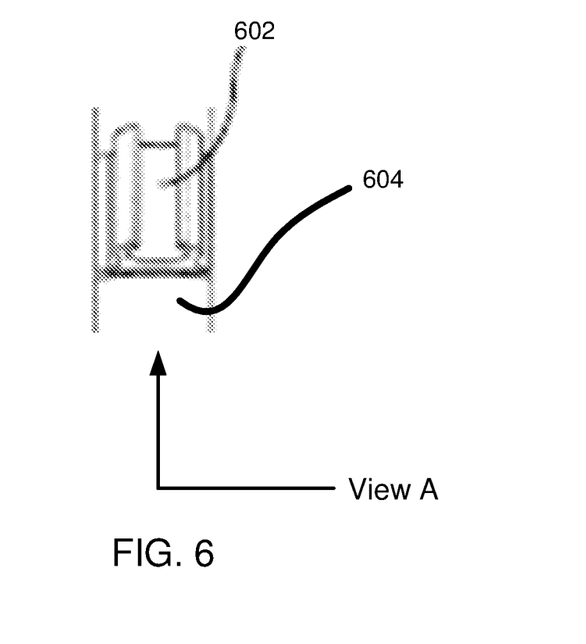
FIG. 6 illustrates a top perspective view of a clasp that is rotatable and moveable along a band, according to an embodiment of the present invention.

Further to the description of FIG. 5a, FIG. 6 illustrates a top perspective view of a clasp 602 that is rotatable and moveable along a band 604, according to an embodiment of the present invention.

Figure 7:
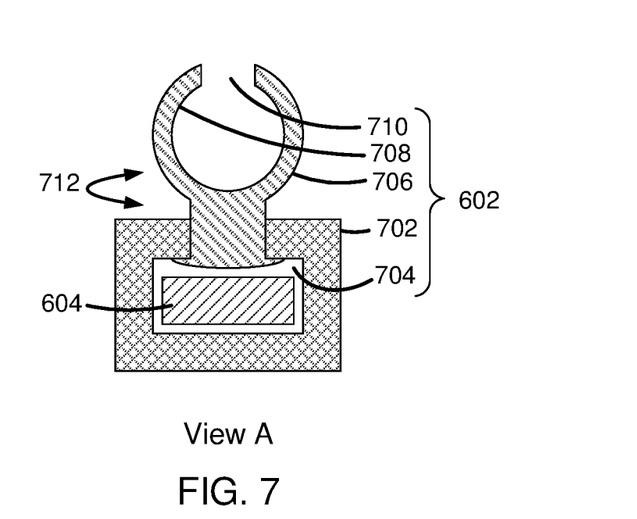
FIG. 7 illustrates a cross-sectional view of the clasp and band of FIG. 6, according to an embodiment of the present invention.

FIG. 7 illustrates a cross-sectional view of clasp 602 and band 604, according to an embodiment of the present invention. In the example of FIG. 7, clasp 602 includes a base 702 having an opening 704 therethrough to receive band 604. Clasp 602 further includes legs 706 and 708 extending from base 702, which define an opening 710 through which to receive an element. Legs 706 and 708 are rotatable as illustrated by an arrow 712.

In the example of FIG. 5b, a first end 540 of band 514 has opening 542 (i.e., the hollow area) through which to receive a second end 544 of band 514. First end 540 of band 514 includes a tab 546 that ex-tends into opening 542 to lockingly engage a protrusion (i.e., of tensioners 522) that extends from a surface of band 514 when second end 544 of band 514 is inserted through opening 542, to secure band 514 to the object.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure.

The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the disclosure to the precise form disclosed.

Modifications and variations are possible in light of the above teachings or may be acquired from practice of the disclosure. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

What is claimed is:

1. An adjustable attachment apparatus comprising:
   a band, wherein a first end of the band has an opening through which to receive a second end of the band, and wherein the first end of the band includes a tab that extends into the opening to lockingly engage a protrusion that extends from a surface of the band when the second end of the band is inserted through the opening of the first end of the band to secure the band to an object;
   a clasp attached to the band, the clasp having an opening to receive and secure an element;
   wherein the clasp is rotatable and moveable along the band; and
   wherein the band has multiple openings through which to receive the clasp.

2. The adjustable attachment apparatus of claim 1, wherein the band is of variable length.

3. The adjustable attachment apparatus of claim 1, wherein the clasp includes multiple clasps of a plurality of sizes to secure elements of various sizes.

4. The adjustable attachment apparatus of claim 1, wherein the clasp is removable from the band and reusable.

5. The adjustable attachment apparatus of claim 1, wherein the band is flexible.

6. The apparatus of claim 1, wherein the clasp includes a base having a first opening through which to receive the second end of the band and a second opening through which to secure the clasp.

7. An adjustable attachment apparatus, comprising:
- a flexible band, designed to fit around an exterior of an object, wherein a first end of the flexible band has an opening through which to receive a second end of the flexible band, and wherein the first end of the flexible band includes a tab that extends into the opening to lockingly engage a protrusion that extends from a surface of the flexible band when the second end of the flexible band is inserted through the opening of the first end of the flexible band to secure the flexible band to an object; and
- a rotatable clasp attached to the flexible band, the clasp having a locking mechanism for holding and securing an element to the flexible band;
- wherein the rotatable clasp is moveable along the flexible band; and
- wherein the band has multiple openings through which to receive the clasp.

8. The adjustable attachment apparatus of claim 7, wherein the rotatable clasp is removable from the flexible band.

9. The adjustable attachment apparatus of claim 7, wherein the locking mechanism comprises a friction fit wherein fastening of the element to the rotatable clasp is achieved by friction when the rotatable clasp and the element are pushed together.

10. The adjustable attachment apparatus of claim 7, wherein the rotatable clasp is reusable.

11. The apparatus of claim 7, wherein the flexible band has multiple openings through which to receive the rotatable clasp.

12. The apparatus of claim 7, wherein the rotatable clasp includes a base having a first opening through which to receive the second end of the band and a second opening through which to secure the clasp.

13. An adjustable attachment apparatus, comprising:
- a flexible band having a proximal end having a female fastener and a distal end having a male fastener, said female fastener and male fastener when joined together form an interlocking mechanism for securing the flexible band to an object; and
- a plurality of clasps configured to hold and secure one or more elements to the flexible band;
- wherein the flexible band includes multiple openings along a length of the flexible band, each opening configured to hold a respective one of the clasps in one of multiple selectable rotational orientations; and
- wherein the clasps are secured within the respective openings to provide a fixed configuration of the clasps at various fixed angles along the length of the band.

14. The adjustable attachment apparatus of claim 13, wherein the clasps are of various sizes and shapes to accommodate elements of varying sizes and shapes.

15. The adjustable attachment apparatus of claim 13, wherein the flexible band is reusable.

16. The adjustable attachment apparatus of claim 13, wherein the flexible band and the clasps are for indoor and outdoor use.

17. The adjustable attachment apparatus of claim 13, wherein the clasps are removable and reusable.

* * * * *